US007888412B2

(12) United States Patent
Holbrey et al.

(10) Patent No.: US 7,888,412 B2
(45) Date of Patent: *Feb. 15, 2011

(54) POLYMER DISSOLUTION AND BLEND FORMATION IN IONIC LIQUIDS

(75) Inventors: John D. Holbrey, Tuscaloosa, AL (US); Richard P. Swatloski, Tuscaloosa, AL (US); Ji Chen, Tuscaloosa, AL (US); Dan Daly, Tuscaloosa, AL (US); Robin D. Rogers, Tuscaloosa, AL (US)

(73) Assignee: Board of Trustees of the University of Alabama, Tuscaloosa, AL (US)

( * ) Notice: Subject to any disclaimer, the term of this patent is extended or adjusted under 35 U.S.C. 154(b) by 427 days.

This patent is subject to a terminal disclaimer.

(21) Appl. No.: 11/087,496

(22) Filed: Mar. 24, 2005

(65) Prior Publication Data

US 2005/0288484 A1 Dec. 29, 2005

Related U.S. Application Data

(60) Provisional application No. 60/556,484, filed on Mar. 26, 2004.

(51) Int. Cl.
*A61K 8/73* (2006.01)
*C08F 220/12* (2006.01)
*C08F 290/06* (2006.01)
*C08G 18/38* (2006.01)
*C08G 18/80* (2006.01)
*C08K 5/01* (2006.01)
*C08K 5/34* (2006.01)
*C08K 5/48* (2006.01)
*C08L 1/00* (2006.01)
*C08L 3/00* (2006.01)
*C08L 5/00* (2006.01)
*C08L 89/00* (2006.01)
*C08L 91/08* (2006.01)
*C08L 97/02* (2006.01)
*C09D 101/00* (2006.01)
*C09D 101/18* (2006.01)
*C09D 103/00* (2006.01)
*C09D 105/00* (2006.01)
*C09D 105/08* (2006.01)
*C09J 101/00* (2006.01)
*C09J 103/00* (2006.01)
*C09J 105/00* (2006.01)
*C09J 105/08* (2006.01)
*C09J 105/10* (2006.01)
*C09J 197/02* (2006.01)
*D21H 19/18* (2006.01)
*D21H 19/54* (2006.01)

(52) U.S. Cl. .................. 524/27; 106/162.1; 106/162.2; 106/162.51; 106/162.9; 106/163.01; 523/305; 524/31; 524/32; 524/35; 524/47; 524/81; 524/86; 524/480

(58) Field of Classification Search ................. 524/480, 524/27, 31, 81, 86, 32, 35, 47; 523/305; 106/162.1, 162.2, 162.51, 162.9, 163.01
See application file for complete search history.

(56) References Cited

U.S. PATENT DOCUMENTS

| | | | |
|---|---|---|---|
| 1,943,176 A | 1/1934 | Graenacher | 260/100 |
| 4,063,017 A | 12/1977 | Tsao et al. | |
| 4,097,666 A | 6/1978 | Johnson et al. | 536/57 |
| 4,188,263 A | 2/1980 | Hulsmann et al. | 435/179 |
| 4,520,105 A | 5/1985 | Sinner et al. | 435/163 |
| 4,522,934 A | 6/1985 | Shum et al. | |
| 5,679,146 A | 10/1997 | Kalt et al. | 106/166.01 |
| 5,683,832 A | 11/1997 | Bonhote et al. | 429/111 |
| 5,747,125 A | 5/1998 | Furlong et al. | 428/34.8 |
| 5,792,399 A | 8/1998 | Meister et al. | 264/101 |
| 5,827,602 A | 10/1998 | Koch et al. | 429/194 |
| 5,856,513 A | 1/1999 | Ue et al. | 548/347.1 |
| 6,376,712 B2 | 4/2002 | Narizuka et al. | 564/385 |
| 6,451,220 B1 | 9/2002 | Ziolo et al. | 252/62.54 |
| 6,613,310 B1 | 9/2003 | Campbell et al. | 424/54 |
| 6,808,557 B2 * | 10/2004 | Holbrey et al. | 106/163.01 |
| 6,824,599 B2 | 11/2004 | Swatloski et al. | 106/163.01 |
| 2002/0010291 A1 | 1/2002 | Murphy | 526/133 |
| 2003/0157351 A1 * | 8/2003 | Swatloski et al. | 428/478.4 |

(Continued)

FOREIGN PATENT DOCUMENTS

CA 2479941 10/2003

(Continued)

OTHER PUBLICATIONS

Benton et al., "Effect of Room-Temperature Ionic Liquids as Replacements for Volatile Organic Solvents in Free-Radical Polymerization," *Amer. Chem. Soc.*, Chapter 10, 125-133 (2002).

(Continued)

*Primary Examiner*—Patrick D Niland
(74) *Attorney, Agent, or Firm*—McKeon Meunier Carlin & Curfman LLC

(57) ABSTRACT

The present invention relates to processes utilizing ionic liquids for the dissolution of various polymers and/or copolymers, the formation of resins and blends, and the reconstitution of polymer and/or copolymer solutions, and the dissolution and blending of "functional additives" and/or various polymers and/or copolymers to form advanced composite materials.

45 Claims, 5 Drawing Sheets

U.S. PATENT DOCUMENTS

| | | | |
|---|---|---|---|
| 2003/0165445 A1 | 9/2003 | Malnou et al. | 424/61 |
| 2003/0233742 A1 | 12/2003 | Jones et al. | 28/118 |
| 2005/0123851 A1 | 6/2005 | Shinbori et al. | 430/270.1 |
| 2005/0196671 A1 | 9/2005 | Paonessa et al. | |
| 2005/0285073 A1 | 12/2005 | Singh et al. | |
| 2006/0118755 A1 | 6/2006 | Fujioka et al. | 252/62.2 |
| 2006/0128996 A1 | 6/2006 | Vaultier et al. | |
| 2006/0194197 A1 | 8/2006 | Spangler et al. | 435/5 |
| 2007/0006774 A1 | 1/2007 | Rogers et al. | |
| 2007/0215300 A1 | 9/2007 | Upfal et al. | |
| 2008/0023162 A1 | 1/2008 | Myllymaki et al. | |
| 2008/0190013 A1 | 8/2008 | Argyropoulos | 44/307 |

FOREIGN PATENT DOCUMENTS

| | | |
|---|---|---|
| CN | 1380110 | 4/2002 |
| DE | 93-4308410 | 3/1993 |
| EP | 0780391 | 6/1997 |
| EP | 1222918 | 7/2002 |
| EP | 1854786 | 11/2007 |
| JP | 58183601 | 10/1983 |
| JP | 86-199569 | 8/1986 |
| JP | 63056501 | 3/1988 |
| JP | 01-017649 | 1/1989 |
| JP | 64017649 | 1/1989 |
| JP | 80089796 | 4/1996 |
| JP | 10265674 | 10/1998 |
| JP | 2003335887 | 5/2002 |
| JP | 2002290011 | 10/2002 |
| JP | 2003171144 | 6/2003 |
| WO | WO2004027897 | 4/1989 |
| WO | WO94/20521 | 9/1994 |
| WO | WO 95/21871 | 8/1995 |
| WO | WO 96/06593 | 3/1996 |
| WO | WO 00/32658 | 12/1999 |
| WO | WO 01/81436 | 11/2001 |
| WO | WO 02/079269 | 10/2002 |
| WO | WO 03/041692 | 11/2002 |
| WO | WO 02/100360 | 12/2002 |
| WO | WO 02/102586 | 12/2002 |
| WO | WO 03/074031 | 3/2003 |
| WO | WO 03/029329 | 4/2003 |
| WO | WO2007/063327 | 6/2007 |
| WO | WO2009/105236 | 8/2009 |
| WO | WO2010/056790 | 5/2010 |

OTHER PUBLICATIONS

Biedron et al., "Ionic Liquids as Reaction Media for Polymerization Processes: Atom Transfer Radical Polymerization (ATRP) of Acrylates in Ionic Liquids," *Polymer International*, 52(10):1584-1588 (2003).

Bonhôte et al., "Hydrophobic, Highly Conductive Ambient-Temperature Molten Salts," *Inorg. Chem.*, 35:1168-1178 (1996).

Endres, "Ionic Liquids: Solvents for the Electrodeposition of Metals and Semiconductors," *ChemPhysChem*, 3:144-154 (2002).

Fannin et al., "Properties of 1,3-Dialkylimidazolium Chloride-Aluminum Chloride Ionic Liquids. 2. Phase Transitions, Densities, Electrical Conductivities, and Viscosities," *J. Phys. Chem.*, 88:2614-2621 (1984).

Fischer et al., "Structural Changes of Cellulose Dissolved in Molten Salt Hydrates," *Book of Abstracts*, 219th ACS National Meeting, San Francisco, CA, Mar. 26-30, 2000 (Abstract).

Gordon et al., "Fused Organic Salts. 8. Properties of Molten Straight-Chain Isomers of Tetra-*n*-pentylammonium Salts," *J. Amer. Chem. Soc.*, 100(24):7445-7454 (1978).

Heinze et al., "Unconventional Methods in Cellulose Functionalization," *Progress in Polymer Science*, 26:1689-1762 (2001).

Holbrey et al., "The Phase Behaviour of 1-Alkyl-3-Methlimidazolium Tetrafluoroborates; Ionic Liquids and Ionic Liquid Crystals," *J. Chem. Soc., Dalton Trans.*, 2133-2139 (1999).

Huddleston et al., "Characterization and Comparison of Hydrophilic and Hydrophobic Room Temperature Ionic Liquids Incorporating the Imidazolium Cation," *Green Chem.* 3:156-164 (2001).

Husemann et al., "Homogeneous Acetylation of Cellulose," *Buletinul Institutului Politehnic din Iasi*, 16(1):47-51 (Abstract Only).

Kirk-Othmer, "Cellulose," *Encyclopedia of Chemical Technology*, 5:476-563 (1993).

Leipner et al., "Structural Changes of Cellulose Dissolved in Molten Salt Hydrates," Macromol. Chem. Phys., 201(15):2041-2049 (2000).

Linko et al., "Cellulose Bead Entrapped Microbial Cells for Biotechnical Applications," *Enzyme Microb. Technol.*, 1:26-30 (1979).

Ma et al., "Reverse Atom Transfer Radical Polymerization of Methyl Methacrylate in Room-Temperature Ionic Liquids," *J. Polymer Sci. Pt. A-Polymer Chem.*, 41:143-151 (2003).

Maia et al., "Cellulose Organic Solvents. I. The Structures of Anhydrous *N*-Methylmorpholine *N*-Oxide and *N*-Methylmorpholine *N*-Oxide Monohydrate," *Acta Cryst*, B37:1858-1862 (1981).

Marson et al., "A Novel, Efficient Procedure for Acylation of Cellulose Under Homogeneous Solution Conditions," *J. Appl. Polymer Sci.*, 74:1355-1360 (1999).

Martin et al., "Anisotropic magnetism in field-structured composites," *Phys. Rev. E.*, 61(3), 2818-2830 (2000).

Mazurkiewicz et al., "Conducting Polymer Electrochemistry in Ionic Liquids," *Synthetic Metals*, 135:31-32 (2003).

Nara et al., "Compositions Consisting of Cationic Polymers Comprising Amidinium Groups and Ionic Liquids," *Tetrahedron Lett.*, 44:1371-1373 (2003).

Ngo et al., "Thermal Properties of Imidazolium Ionic Liquids," *Thermochimica Acta.*, 357-358:97-102 (2000).

Ohno et al., "A New Type of Polymer Gel Electrolyte: Zwitterionic Liquid/Polar Polymer Mixture," *Electrochimica Acta.*, 48(14-16):2079-2083 (2003).

Okamoto et al., "Synthesis, Spectra, and Reactions of N-Triphenylmethylpyridinium Salts. Reactions of Triphenylmethyl Chloride with Pyridine Under High Pressure," *J. Org. Chem.*, 35(11):3752-3756 (1970).

Perrier et al., "Reversible Addition—Fragmentation Chain Transfer Polymerization of Methacrylate, Acrylate and Styrene Monomers in 1-Alkyl-3-Methylimidazolium Hexfluorophosphate," *European Polymer J.*, 39(3):417-422 (2003).

Ren et al., "Synthesis of 1-Allyl-3-Methylimidazolium-Based Room Temperature Ionic Liquid and Preluviinary Study of its Dissolving Cellulose," *Acta Polymerica Sinica*, 448-451 (2003) (in Chinese).

Shriver et al., "Inorganic Chemistry," *W. H. Freeman*, NY, 406-407 (1990).

Snedden et al., "Cross-Linked Polymer-Ionic Liquid Composite Materials," *Macromolecules*, 36(12):4549-4556 (2003).

Suarez et al., "Synthesis and Physical-Chemical Properties of Ionic Liquids Based on 1-*n*-Butyl-3-Methylimidazolium Cation," *J. Chim. Phys.*, 95:1626-1639 (1998).

Swatloski et al., "Dissolution of Cellulose with Ionic Liquids," *J. Am. Chem. Soc.*, 124:4974-4975 (2002).

Swatloski et al., "Ionic Liquids for the Dissolution and Regeneration of Cellulose," *In Molten Salts XIII, Proceedings of the thirteenth international symposium on molten salts*, De Long et al., eds., 155-165 (2002).

Weckstrom et al., "Food Engineering in Food Processing," *Applied Science Publishers Ltd.*, 2:148-151 (1979).

Wilkes et al., "Air and Water Stable 1-Ethyl-3-methylimidazolium Based Ionic Liquids," *J. Chem. Soc., Chem Commun.*, 965-967 (1992).

Wu et al., "Homogenous Acetylation of Cellulose in a New Ionic Liquid," *Biomacromol.*, 5:266-268 (2004).

Written Opinion of PCT/US05/010235, Jan. 3, 2007.

Al-Adhami et al., "Immobilization of Modified Cellulose and Acrylic on Wood-Rotting Fungi Swelling Carriers," *J Process Biochemistry*, 37:1387-94, 2002.

Ast et al., "Efficient Assembly of Peptomers on Continuous Surfaces," *Tetrahedron Lett*, 40:4317, 1999.

BlankeMeyer-Menge et al., "Simultaneous Multiple Synthesis of Protected Peptide Fragments on Allyl-Functionalized Cellulose Disc Supports," *Tetrahedron Lett*, 29:5871, 1988.

Bora et al., A Simple Method for Functionalization of Cellulose Membrane for Covalent Immobilization of Biomolecules, *J Membr Sci*, 250:215-22, 2005.

Chesney et al., "Amino-Derivatised Beaded Cellulose Gels. Novel Accessible and Biodegradable Scavenger Resins for Solution Phase Combinatorial Synthesis," *Green Chem*, 2:57-62, 2000.

Froehner and Eriksson, "Properties of the Glycoprotein Laccase Imobilised by Two Methods," *Acta Chem Scand B*, 29:691, 1975.

Gelbrich, "Colloidal Structures Based on Topochemically Modified Cellulose," *Papier* (Heidelberg), 52:755, 1998 (translated into English from German).

Gemeiner, In Enzyme Engineering, Gemeiner, Ed., Ellis Horwood Series in *Biochemistry and Biotechnology*, Ellis Horwood Limited: West Sussex, England, pp. 158-179, 1992.

Harkin and Obst, "Lignification in Trees: Indication of Exclusive Peroxidase Participation," *Science*, 180:296-98, 1973.

Hirayama, "Rapid Confirmation and Revision of the Primary Structure of Bovine Serum Albumin by ESIMS and Frit-FAB LC/MS," *Biochem Biophys Comm*, 173:639-646, 1990.

Illanes et al., "Immobilization of Lactase and Invertase on Crosslinked Chitin," In Bioreactor Immobilized Enzymes and Cells, Moo-Young, Ed., *Elsevier Applied Science:* London, 233-49, 1998.

Illanes, "Stability of Biocatalysts," *Elec J Biotechnol*, 2(1):1-9, 1999.

International Search Report for PCT/US06/24863 filed Jun. 27, 2006.

Krajewska, "Application of Chitin- and Chitosan-based Materials for Enzyme Immobilizations: A Review," *Enz Microb Technol*, 35:126-39, 2004.

Lau et al., "Dissolution of *Candida antarctica* Lipase B in Ionic Liquids: Effects on Structure and Activity," *Green Chem*, 6:483-87, 2004.

Mais et al., "Modification of Cellulose Using Cellulose P-Toluenesulfonates as Intermediates," *Zeszyty Naukowe Politechniki Slaskiej Chemm*, 140:121-1999.

Sakai, "Determination of Pore Size and Pore Size Distribution," *J Membr Sci*, 96:91-130, 1994.

Stöllner et al., "Activation of Cellulose Membranes With 1,1'-Carbonyldiimidazole or 1-Cyano-4-Dimethylaminopyridinium Tetrafluoroborate as a Basis for the Development of Immunosensors," *Anal Biochem*, 304:157-65, 2001.

Tiller et al., "A Novel Efficient Enzyme-Immobilization Reaction on $NH_2$ Polymers by Means of L-Ascorbic Acid," *Biotechnol Appl Biochem*, 30:155-62, 1999.

Turner et al., "Production of Bioactive Cellulose Films Reconstituted from Ionic Liquids," *Biomacromolecules*, 5:1379-84, 2004.

Fisher et al., "Structural Changes of Cellulose Dissolved in Molten Salt Hydrates," 219th ACS National Meeting, San Francisco, CA, 2000.

International Search Report and Written Opinion for PCT/US2006/020941 filed May 30, 2006.

Ren et al., "Synthesis of 1-Allyl-3-Methylimidazolium-Based Room Temperature Ionic Liquid and Preliminary Study of its Dissolving Cellulose," Acta Polymerica Sinica, 448-51, 2003 (Abstract).

Bardeletti, G. "Enzyme immobilization on polyethyleneimine-coated magnetite particles," Methods. In Botech. 1, Immobilization of enzymes and cells, pp. 133-141, 1997.

International Search Report and Written Opinion for PCT/US09/064105 mailed Jan. 13, 2010.

Lee et al., "Ionic liquid-mediated selective extraction of lighin from wood leading to enhanced enzymatic cellulose hydrolsis," Biotechnology and Bioengineering. Published online Oct. 24, 2008, in Wiley InterScience (www.wileyinterscience.com). DOI 10.1002/bit.22179. p. 1372, Table 2.

Swatloski et al., "Ionic Liquids for the Dissolution and regeneration of cellulose," Electrochem. Soc. Proceed. 19:155-164, 2002.

Turner, M. "Immobilization of Biocatalysts using novel IL-reconstituted cellulosic support materials," presentation on Apr. 19, 2005.

Earle et al., "Ionic liquids. Green Solvents for the future," Pure Appl. Chem., 72(7):1391-1398 (2000).

Huddleston et al., "Room Temperature Ionic Liquids as Novel Media for Clean Liquid-Liquid Extraction," Chem. Commun., 1765-1756 (1998).

International Search Report and Written Opinion for PCT/2009/01066, issued Jun. 22, 2009.

Liebert et al., "Tailored Cellulose Esters: Synthesis and Structure Determination," Biomacromolecules, 6:333-40 (2005).

Sun et al. "Magnetite-Embedded Cellulose Fibers Prepared From Ionic Liquid," J. Materials Chem., 18:283-290 (2008).

Supplemental Search Report for EP4757863, issued May 12, 2009.

Visser et al. "Task Specific Ionic Liquids for the Extraction of Metal Ions from Aqueous Solutions," Chem. Commun., 135-136 (2001).

\* cited by examiner

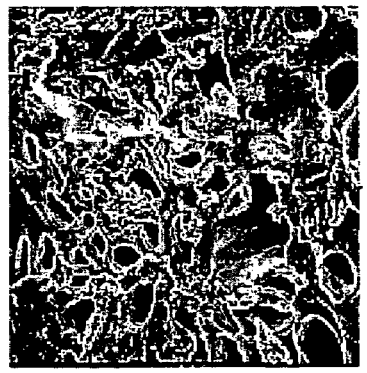
Figure 1. Scanning Electron Micrograph (SEM) of PAN reconstituted from IL, and regeneration into water (×500).
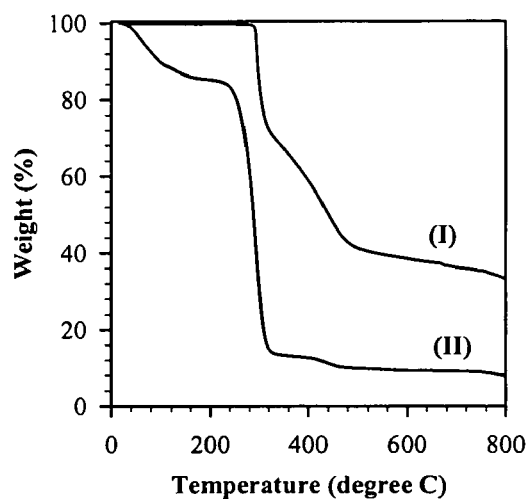
Figure 2. Thermogravimetric analysis (TGA) of (I) pure PAN and (II) regenerated PAN powder.

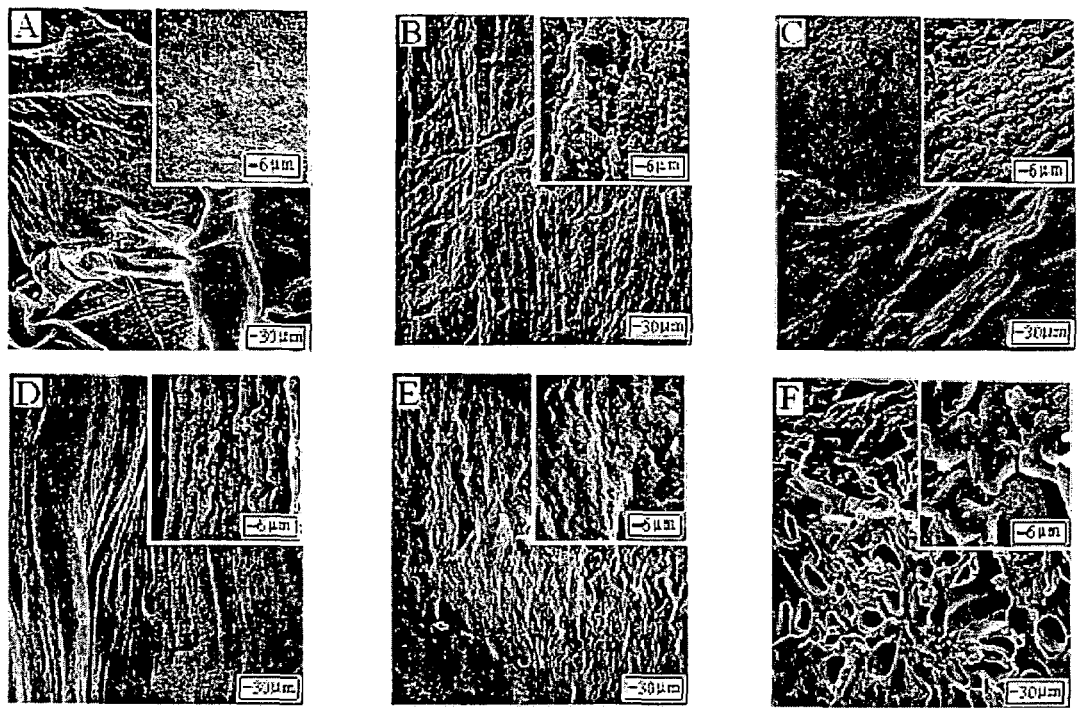
Figure 3. Scanning Electron Micrographs (SEM) of cellulose (wood pulp, DP=1056)/ polyacrylonitrile (PAN) blend. (A) regenerated cellulose; (B) cellulose/PAN; 20/80 (weight ratio); (C) cellulose/PAN40/60; (D) cellulose/PAN 60/40; (E) Cellulose/PAN, 80/20; (F) Regeneration PAN (×500 and ×5000)

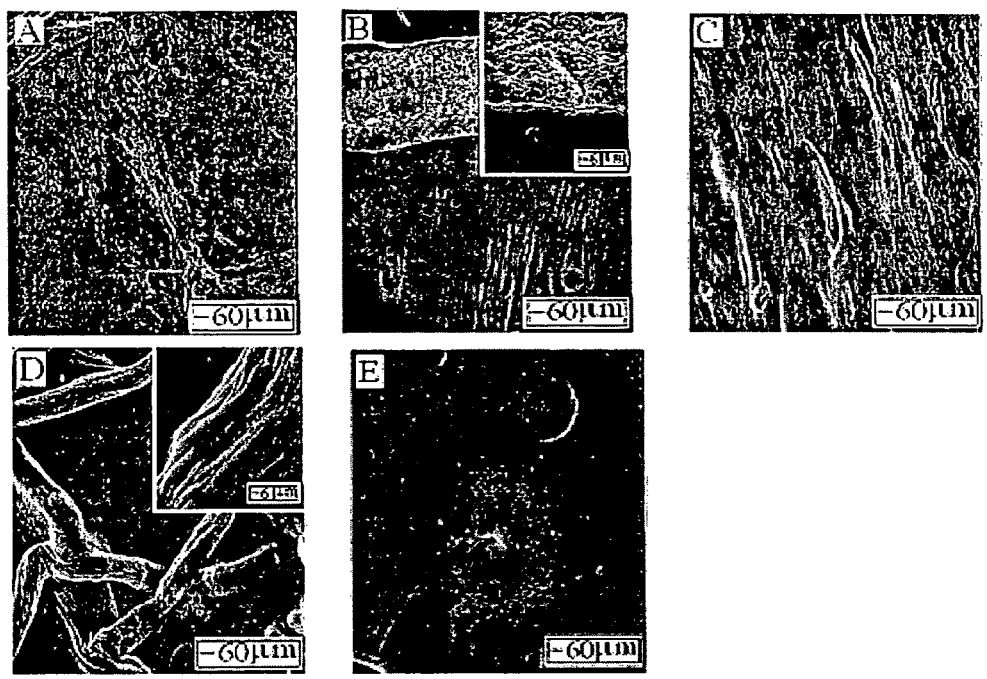
Figure 4. Scanning Electron Micrographs (SEM) of cellulose/poly-2-hydroxymethylmethacrylate (PHEMA). (A) cellulose/PHEMA 20/80; (B) cellulose/PHEMA 40/60; (C) cellulose/PHEMA 60/40(1); (D) cellulose/PHEMA 60/40(2); (E) cellulose/PHEMA 80/20 (×500 and ×5000).

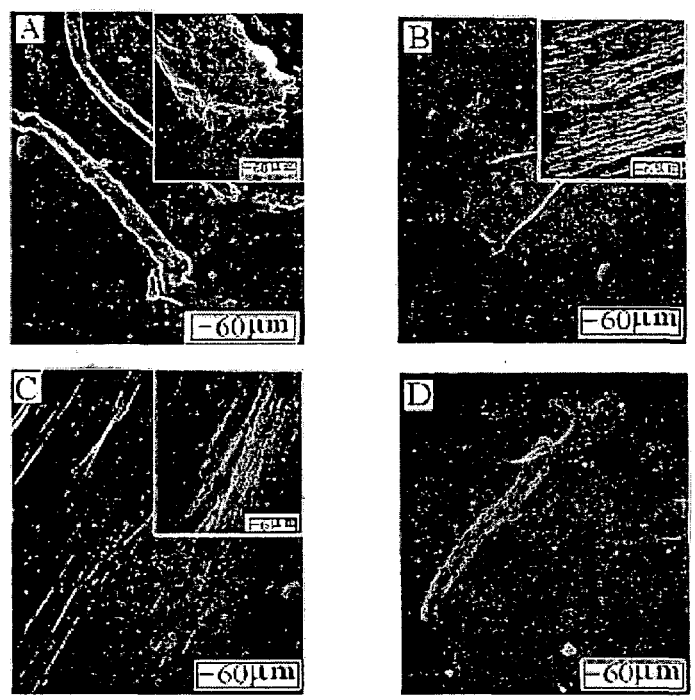
Figure 5. Scanning Electron Micrographs (SEM) of Cellulose/PVA blend at different ratio A: cellulose/PVA 20/80; B: cellulose/PVA 40/60; C: cellulose/PVA 60/40; D: cellulose/PVA 80/20. (×500 and ×5000). Equipment and procedure are similar to Figure 1.

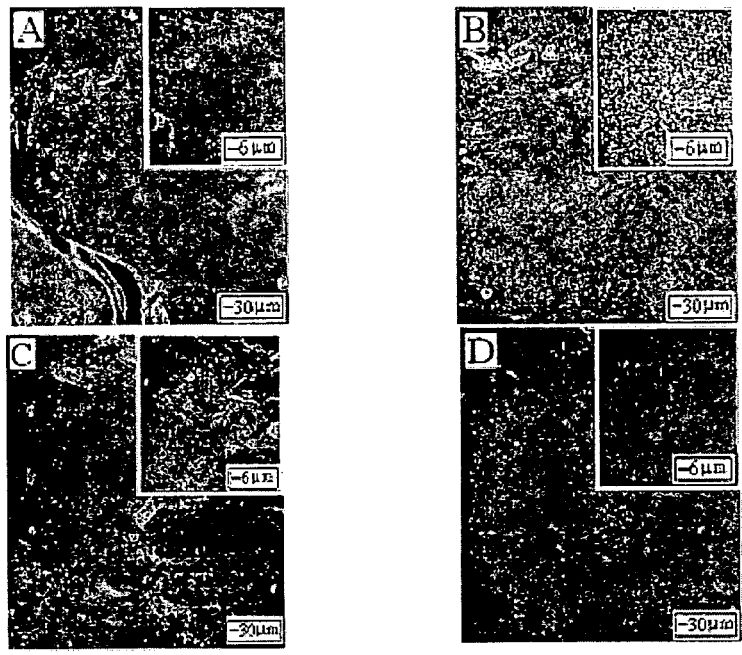

Figure 6. Scanning Electron Micrographs (SEM) of cellulose/ polyaniline emeraldine base (PANI): (A) cellulose/ PANI 20/80; (B) cellulose/PHEMA 40/60; (C) cellulose/PANI 60/40; (D) cellulose/PANI 80/20 (×500 and ×5000).

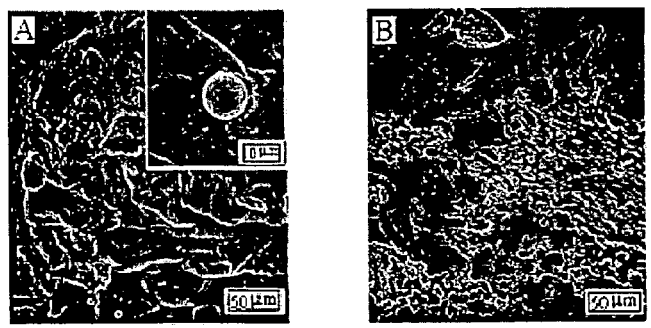

Figure 7. Scanning Electron Micrographs (SEM) of cellulose/Polyethylene glycol –2000 (PEG): (A) cellulose/PEG 40/60; (B) cellulose/PEG 60/40. The layer like structure is indicative of an immiscible blend (×300 and ×2000).

POLYMER DISSOLUTION AND BLEND FORMATION IN IONIC LIQUIDS

This present application claims the benefit of U.S. Provisional Application Ser. No. 60/556,484, filed Mar. 26, 2004, the entire contents of which are hereby incorporated by reference.

BACKGROUND OF THE INVENTION

1. Field of the Invention

The present invention relates to processes utilizing ionic liquids for the dissolution of various polymers and/or copolymers, the formation of resins and blends, and the reconstitution of polymer and/or copolymer solutions, along with the dissolution and blending of "functional additives" and/or various polymers and/or copolymers to form advanced composite materials.

2. Background of the Invention

The use of ionic liquids as replacements for conventional organic solvents in chemical, biochemical and separation processes has been demonstrated. Graenacher, U.S. Pat. No. 1,943,176, first suggested a process for the preparation of cellulose solutions by heating cellulose in a liquid N-alkylpyridinium or N-arylpyridinium chloride salt, especially in the presence of a nitrogen-containing base such as pyridine. However, that finding seems to have been treated as a novelty of little practical value because the molten salt system was, at the time, somewhat esoteric. This original work was undertaken at a time when ionic liquids were essentially unknown and the application and value of ionic liquids as a class of solvents had not been realized.

Ionic liquids are now a well-established class of liquids containing solely ionized species, and having melting points largely below 150° C., or most preferably below 100° C. In most cases, ionic liquids (ILS) are organic salts containing one or more cations that are typically ammonium, imidazolium or pyridinium ions, although many other types are known. The range of ionic liquids that are applicable to the dissolution of cellulose are disclosed in U.S. Pat. No. 6,824,599, herein incorporated in its entirety by reference, and in Swatloski et al., J. Am. Chem. Soc. 2002, 124:4974-4975.

Traditional cellulose dissolution processes, including the cuprammonium and xanthate processes, are often cumbersome or expensive, and require the use of unusual solvents, typically with a high ionic strength. These processes are also used under relatively harsh conditions (Kirk-Othmer "Encyclopedia of Chemical Technology", Fourth Edition 1993, volume 5, p. 476-563). Such solvents include carbon disulfide, N-methylmorpholine-N-oxide ((NMMO), mixtures of N,N-dimethylacetamide and lithium chloride (DMAC/LiCl), dimethylimidazolone/LiCl, concentrated aqueous inorganic salt solutions ($ZnCl/H_2O$, $Ca(SCN)_2/H_2O$), concentrated mineral acids ($H_2SO_4/H_3PO_4$4) or molten salt hydrates ($LiClO_4.3H_2O$, $NaSCN/KSCN/LiSCN/H_2O$).

These traditional cellulose dissolution processes break the cellulose polymer backbone resulting in regenerated products that contain an average of about 500 to about 600 glucose units per molecule rather than the native larger number of about 1500 or more glucose units per molecule. In addition, processes such as that used in rayon formation, proceed via xanthate intermediates, and tend to leave some residual derivatized (substituent groups bonded to) glucose residues as in xanthate group-containing cellulose.

Other traditional processes that can provide a solubilized cellulose, do so by forming a substituent that is intended to remain bonded to the cellulose, such as where cellulose esters like the acetate and butyrate esters are prepared, or where a carboxymethyl, methyl, ethyl, 2-hydroxyalkyl (for example, hydroxyethyl or hydroxypropyl), or the like group, is added to the cellulose polymer. Such derivative (substituent) formation also usually leads to a lessening of the degree of cellulose polymerization so that the resulting product contains fewer cellobiose units per molecule than the cellulose from which it was prepared.

Physical and chemical processing methods for treating cellulosic resources are numerous. Chemical, enzymic, microbiological and macrobiological catalysts can be used to accelerate the process under conditions selected to be thermodynamically favorable to product formation.

Chemical processes include oxidation, reduction, pyrolysis, hydrolysis, isomerization, esterification, alkoxylation and copolymerization. Chemical and enzymatic hydrolysis of cellulose is discussed in *The Encyclopedia of Polymer Science and Technology*, 2nd Ed, J. I. Kroschwitz (Ed in Chief), Wiley (New York), 1985. Wood, paper, cotton, rayon, cellulose acetate, and other textiles are a few examples of the broad range of cellulosic materials.

With increasing industrial pollution and consequent governmental regulations, the need to implement "green" processes to prevent pollution and waste production and to utilize renewable resources is becoming increasingly prominent. The efficiency of existing methods for dissolving and derivatizing cellulose can be significantly improved by the availability of suitable solvents for refined and natural cellulose; an example is N-methylmorpholine-N-oxide (NMMO), used as a solvent for non-derivatizing dissolution of cellulose for the production of lyocell fibers. [http://www.lenzing.com.]

It has been reported that cellulose can be dissolved in solvents describe as ionic liquids that are substantially free of water, nitrogen-containing bases and other solvents (U.S. Pat. No. 6,824,599). However, processes for producing cellulose blends and other polymeric blends with a wide range of possible polymeric components, and a wide range of properties, have yet to be fully developed.

SUMMARY OF THE INVENTION

Accordingly, one object of the invention is to provide a process for preparing a polymeric resin using an ionic liquid.

Another object of the invention is to provide a process for preparing a polymeric blend using an ionic liquid.

Another object of the invention is to provide a process for making a polymer resin or blend with targeted properties.

Another object of the invention is to provide a process for making a polymer resin or blend with targeted rheological properties.

Another object of the invention is to provide a polymer resin consisting of one or more polymers.

Another object of the invention is to provide a polymer blend consisting of two or more polymers.

Another object of the invention is to provide a polymer resin or blend with targeted properties.

Another object of the invention is to provide a polymer resin or blend with targeted rheological properties.

These and other objects of the present invention have been satisfied, either individually or in combinations thereof, by the discovery of a process for the making a polymeric resin or blend comprising mixing one or more polymeric materials with at least one ionic liquid and separating the resin or blend from the ionic liquid; and the resins and blends prepared therefrom.

BRIEF DESCRIPTION OF THE DRAWINGS

FIG. 1 is a Scanning Electron Micrograph (SEM) of PAN reconstituted from IL, and regeneration into water (×500).

FIG. 2 is a Thermogravimetric analysis (TGA) of (I) pure PAN and (II) regenerated PAN powder.

FIGS. 3A-3F are Scanning Electron Micrographs (SEM) of various cellulose (wood pulp, DP=1056)/polyacrylonitrile (PAN) blend, wherein (A) is regenerated cellulose; (B) is cellulose/PAN; 20/80 (weight ratio); (C) is cellulose/PAN40/60; (D) is cellulose/PAN 60/40; (E) is Cellulose/PAN, 80/20; and (F) is Regeneration PAN (×500 and ×5000).

FIGS. 4A-4E are Scanning Electron Micrographs (SEM) of various cellulose/poly-2-hydroxymethylmethacrylate (PHEMA) blends wherein (A) is cellulose/PHEMA 20/80; (B) is cellulose/PHEMA 40/60; (C) is cellulose/PHEMA 60/40(1); (D) is cellulose/PHEMA 60/40(2); and (E) is cellulose/PHEMA 80/20 (×500 and ×5000).

FIGS. 5A-5D are Scanning Electron Micrographs (SEM) of Cellulose/PVA blends at different ratios, wherein (A) is cellullose/PVA 20/80; (B) is cellulose/PVA 40/60; (C) is cellulose/PVA 60/40; and (D) is cellulose/PVA (×500 and ×5000). Equipment and procedure are similar to FIG. 1.

FIGS. 6A-6D are Scanning Electron Micrographs (SEM) of cellulose/polyaniline emeraldine base (PANI) blends at different ratios, wherein (A) is cellulose/PANI 20/80; (B) is cellulose/PHEMA 40/60; (C) is cellulose/PANI 60/40; and (D) is cellulose/PANI 80/20 (×500 and ×5000).

FIGS. 7A-7B are Scanning Electron Micrographs (SEM) of cellulose/Polyethylene glycol-2000 (PEG) blends at different ratios, wherein (A) is cellulose/PEG 40/60; and (B) is cellulose/PEG 60/40. The layer like structure is indicative of an immiscible blend (×300 and ×2000).

DETAILED DESCRIPTION OF THE PREFERRED EMBODIMENTS

The term resin as used herein, includes one or more polymers, one or more copolymers and combinations thereof.

The term blend as used herein, includes two or more polymers, two or more copolymers and combinations thereof, immiscible or miscible at the molecular level or domain level. The term polymer includes a polymer prepared from one monomeric unit.

The term copolymer includes a polymer prepared from two or more monomeric units.

The term polymeric materials includes one or more polymers, copolymers and mixtures thereof.

The present invention provides a process utilizing ionic liquids for the dissolution of various polymers, the formation of polymer resins and blends, and reconstitution of said polymeric solutions. The unique solvation properties of ionic liquids allow for the dissolution of a wide range of polymers, which in turn, allows for the creation of new materials with adjustable properties. Ionic liquids provide a unique opportunity for multiple polymer dissolutions, which allow for the formation of blends comprising binary, ternary and multi-component systems. The reconstituted resins from non-solvents find application in engineering materials, extruded objects, fibers, beads, and membranes.

The processes of the present invention use polymers that contain various repeating monomeric units. These monomer units may contain polar, non-ionic, and charged groups, including, but not limited to, $-NH_2-$, $-NHR$, $-NR_2$, $-N^+R_3X^-$, $-O-$, $-OH$, $-COOH$, $-COO^-M^+$, $-SH$, $-SO_3^-M^+$, $-PO_3^-M_2^+$, $-PR_3$, $-NH-CO-NH_2$ and $-NHC(NH)NH_2$. These groups may be present in sufficient numbers along, or pendent to, the polymeric backbone, in polymers, such as, polyacrylamide, polyvinyl alcohol, polyvinyl acetate, poly(N-vinylpyrrolidinone) and poly(hydroxyethyl acrylate). These groups also impact the solubility of the respective polymer. The polymer can have a complex structure due to intramolecular hydrogen bonding, ionic interactions, intermolecular interactions, and chain-chain complexation. These interactions govern the solution properties and performance. Solvent properties such as polarity, charge, hydrogen bonding, interactions between the polymer and the solvent are also important in effective dissolution and blending.

The present invention provides a new process of dissolution and reconstitution of unique polymer resins and blends due to the enhanced solvation properties of ionic liquids. For example, three abundant polysaccharides, cellulose, starch, and chitin do not dissolve in most common solvents directly, due to their unique molecular and supermolecular structure. One way to enhance a polymer's dissolution is to chemically modify it, for example, by adding one or more hydroxyethyl, hydroxypropyl, methyl, carboxymethyl, sulfate, or phosphate groups to the polymer structure. These modifications alter the polymer's aforementioned interactions, thereby, increasing its solubility in common organic solvents and in many cases water. Instead of chemically altering the polymer, the present invention provides a method of processing the virgin polymer using ionic liquids as the solvent, thus lessening chemical usage and processing steps, and making the overall process more environmentally and economically sustainable.

Ionic liquids are a class of solvents composed of ionized species in contrast to traditional organic or aqueous solvents which are molecular nonionics. Ionic liquids are being implemented as potentially green solvents to replace common volatile organic compounds. Ionic liquids are typically comprised of an organic cation usually created by alkylation of a compound, including, but not limited to, imidazoles, pyrazoles, thiazoles, isothiazoles, azathiozoles, oxothiazoles, oxazines, oxazolines, oxazaboroles, dithiozoles, triazoles, selenozoles, oxaphospholes, pyrroles, boroles, furans, thiophens, phospholes, pentazoles, indoles, indolines, oxazoles, isoxazoles, isotriazoles, tetrazoles, benzofurans, dibenzofurans, benzothiophens, dibenzothiophens, thiadiazoles, pyridines, pyrimidines, pyrazines, pyridazines, piperazines, piperidines, morpholones, pyrans, annolines, phthalazines, quinazolines and quinoxalines, and combinations thereof.

The anionic portion of the ionic liquid can be composed of an inorganic or organic moiety and typically comprises halogens, $BX_4^-$, $PF_6^-$, $AsF_6^-$, $SbF_6^-$, $NO_2^-$, $NO_3^-$, $SO_4^{2-}$, $BR_4^-$, substituted or unsubstituted carboranes, substituted or unsubstituted metallocarboranes, phosphates, phosphites, polyoxometallates, substituted or unsubstituted carboxylates, triflates and noncoordinating anions; and wherein R includes, but is not limited to, hydrogen, alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, acyl, silyl, boryl, phosphino, amino, thio, seleno, and combinations thereof. By altering the combination of cations and anions, one has the ability to fine-tune the ionic liquid with the desired solvent properties needed for a specific dissolution/blending.

Ionic Liquids ("ILs") have a more complex solvent behavior compared with traditional aqueous and organic solvent, because ILs are salts and not a molecular, nonionic solvent. Types of interactions between ILs with many solutes, include dispersion, π-π, n-π, hydrogen bonding, dipolar and ionic/charge-charge. The Abraham solvation equation is an important method used to characterize ILs solvent property to understand the polymer dissolution behavior in ILs. Some typical $C_4$mim ILs interaction parameters are shown in Table 1 below. ILs that have strong dipolarity, hydrogen bond accepting (A) ability, and hydrogen bond donating (B) ability are compared with other solvents that are capable of dissolving cellulose (see table below). $C_4$mimCl, one of the most unique solvents, shows the largest A (a=4.860) and a strong ability to interact with solute molecules via non-bonding or $\pi$-electron interaction (r=0.408). The cation $C_4$mim, in combination with the anion $Cl^-$, exhibits significant ability to interact with $\pi$-systems of solute molecules (Anderson, J. L. et. al). The smaller Gibbs free energies of hydration of $Cl^-$ ($\Delta G_{hyd}$=–347 kJ/mol) shows a larger HBA 4.860, compared to that of 1.660 of $[BF_4^-]$ ($\Delta G_{hyd}$=–200 kJ/mol).

TABLE 1

| Ionic liquid | R | S | A | B | 1 |
|---|---|---|---|---|---|
| $C_4$mim Cl | 0.408 | 1.826 | 4.860 | −0.121 | 0.392 |
| $C_4$mim $BF_4$ | −0.141 | 1.365 | 1.660 | −0.283 | 0.473 |
| $C_4$mim $PF_6$ | 0 | 1.540 | 1.369 | 0 | 0.439 |
| Dimethylacetamide | .36 | 1.33 | 0 | .78 | .787 |
| Dimethylformamide | .37 | 1.31 | 0 | .74 | .6468 |
| Dimethylsulfoxide | .52 | 1.74 | 0 | .88 | .776 |

R is the excess molecular refraction,
1 is the molecular volume
A is the hydrogen bond acidity parameter
B is the hydrogen bond basicity parameter
S is the polarity/polarisability parameter Advanced materials prepared using the processes and resins and blends of the invention can be used in an array of technologies. Examples include self-forming nanodevices, intelligent textiles, and new materials for drug delivery, advanced sensors, and separations.

The resins and blends of the present invention are useful as molded or extruded plastic objects, fibers, beads, or films. Moreover, various additives can be added to enhance properties. Regenerated cellulose can be used to encapsulate one or more substances as reported in U.S. Pat. 6,808,557, which is herein incorporated in its entirety by reference.

The present invention provides a process for preparing polymeric resins and blends using one or more ionic liquids. The present invention also provides a separation step wherein the ionic liquid(s) is removed from the polymeric resin or blend. The ionic liquid may be removed by use of a liquid substance that will dissolve the ionic liquid, but not the resin or blend (i.e., a suitable liquid substance that will act as a solvent to the ionic liquid and as a non-solvent to the resin or blend, hereinafter denoted as a "non-solvent"). Suitable non-solvents include, but are not limited to, polar liquid systems, such as water, alcohols and other hydric liquids. In a preferred embodiment, the ionic liquid is removed by the addition of water.

In one embodiment of the invention, the ionic liquid may be a liquid salt complex that exists in the liquid phase between about −70 to about 300° C.

In another embodiment of the invention, the polymeric resin or blend is prepared from two or more polymers or copolymers. In a preferred embodiment, a mixture of at least two polymeric materials are provided in a ratio to yield a resin or blend with predicted properties, including, but not limited to, chemical, thermal and mechanical properties. Specific properties include, but are not limited to, viscosity, melting point, melt index, surface properties, oxidation resistance and solubilities. In another embodiment, a mixture of at least two polymeric materials are provided in a ratio to yield a polymer blend with predicted domain sizes.

The present invention also provides the mixing of one or more polymers and/or copolymers with one or more ionic liquids. Mixing can be accomplished by any conventional procedure in the art, including, but not limited to, various stirring mechanisms, agitation mechanisms, sonication and vortexing. In a preferred embodiment, the mixture is heated to about 100° C. The addition of heat may be supplied by any conventional and non-conventional heat source, including, but not limited to, a microwave source. It has been found that microwave radiation not only provides heat, but also facilitates the dissolution of polymeric materials in the ionic solvent. It is speculated that the facilitated dissolution may be due to the absorption and resulting increase molecular motions of solute and solvent.

Ionic liquids allow for the dissolution of cellulose without derivatization, in high concentration. Such a solution may be heated to about 100° C., or to about 80° C., in an ultrasonic bath. This heating can be effectively accomplished by using microwave radiation supplied by a domestic microwave oven. In one embodiment of the invention, an admixture of hydrophilic ionic liquid and cellulose is heated to a temperature of about 100 to about 150° C., using microwave radiation.

Polymers and Copolymers

Suitable polymers and copolymers for use in the process of the present invention include, but are not limited to, polymers and copolymers formed by step, chain, ionic, ring-opening and catalyzed polymerizations.

Suitable polymers and copolymers can be derived from natural and synthetic sources, including, but are not limited to, polysaccharides, polyester, polyamide, polyurethane, polysiloxane, phenol polymers, polysulfide, polyacetal, polyolefins, acrylates, methacrylates and dienes. In particular, preferred polymers include, but are not limited to, cellulose, hemicellulose, starch, chitin, silk, wool, poly-2-hydroxymethylmethacrylate, poly-2-hydroxyethylmethacrylate, polyamides, polyesters, polyimideamides, polybenzoimide, aramides, polyimides, polyvinyl alcohol, polyaniline, polyethylene glycol, polyacrylonitrile, polystyrene, polyethylene oxide with terminal amine groups, linear polyethyleneimine, and branched polyethyleneimine.

Monomers include, but are not limited to, a-olefins, 2-hydroxyalkylmethacrylate, aniline, acrylonitrile, ethylene, isobutylene, styrene, vinyl chloride, vinyl acetate, vinyl alcohol, methyl metharcyalte, ethylene glycol, cellobiose, vinylidene chloride, tetrafluoroethylene, formaldehyde, acetaldehyde, vinylpyrrolidinone, butadiene and isoprene.

Ionic Liquids

The ionic liquids comprise one or more cations and one or more anions. In a preferred embodiment of the invention, a mixture of cations and anions is selected and optimized for the dissolution of a particular polymeric blend.

In one embodiment, the cation is preferably derived from an organic compound, including, but not limited to, the following heterocyclics: imidazoles, pyrazoles, thiazoles, isothiazoles, azathiozoles, oxothiazoles, oxazines, oxazolines, oxazaboroles, dithiozoles, triazoles, selenozoles, oxaphospholes, pyrroles, boroles, furans, thiophens, phospholes, pentazoles, indoles, indolines, oxazoles, isoxazoles, isotriazoles, tetrazoles, benzofurans, dibenzofurans, benzothiophens, dibenzothiophens, thiadiazoles, pyridines, pyrimidines, pyrazines, pyridazines, piperazines, piperidines, morpholones, pyrans, annolines, phthalazines, quinazolines and quinoxalines, quinolines, pyrrolidines, isoquinolines, and combinations thereof.

The anionic portion of the ionic liquid preferably comprises at least one of the following groups: halogens, $BX_4^-$, $PF_6^-$, $AsF_6^-$, $SbF_6^-$, $NO_2^-$, $NO_3^-$, $SO_4^{2-}$, $BR_4^-$, substituted or unsubstituted carboranes, substituted or unsubstituted metallocarboranes, phosphates, phosphites, polyoxometallates, substituted or unsubstituted carboxylates, triflates and non-coordinating anions; and wherein R is at least one member selected from the group consisting of hydrogen, alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, acyl, silyl, boryl, phosphino, amino, thio, seleno, and combinations thereof.

In a preferred embodiment, cations that contain a single five-membered ring free of fusion to other ring structures, such as an imidazolium cation are particularly preferred, and the anion of the ionic liquid is preferably a halogen or pseudohalogen. For example, a 1,3-di-($C_1$-$C_6$ alkyl or $C_1$-$C_6$ alkoxyalkyl)-substituted-imidazolium ion is a particularly preferred cation. The corresponding anion can preferably be a halogen or pseudohalogen. In addition, a 1-($C_1$ $C_6$alkyl)-3-(methyl)-imidazolium [Cnmim, where n=1-6] cation is also preferred, and a halogen is a preferred anion.

A contemplated ionic liquid is liquid at or below a temperature of about 200° C., and preferably below a temperature of about 150° C., and above a temperature of about −100° C. For example, N-alkylisoquinolinium and N-alkylquinolinium halide salts have melting points of less than about 200° C. The melting point of N-methylisoquinolinium chloride is about 183° C., and N-ethylquinolinium iodide has a melting point of about 158° C. More preferably, a contemplated ionic liquid is liquid (molten) at or below a temperature of about 120° C., and above a temperature of minus 44° C. (−44° C.). Most preferably, a contemplated ionic liquid is liquid (molten) at a temperature of about −10 to about 100° C.

Further examples of ionic liquids include, but are not limited to, [$C_2$mim]Cl, [$C_3$mim]Cl, [$C_4$mim]Cl, [$C_6$mim]Cl, [$C_8$mim]Cl, [$C_2$mim]I, [$C_4$mim]I, [$C_4$mim][$PF_6$], [$C_2$mim][$PF_6$], [$C_3$mim][$PF_6$], [$iC_3$mim][$PF_6$], [$C_6$mim][$PF_6$], [$C_4$mim][$BF_4$], [$C_2$mim][$BF_4$], [$C_2$mim][$C_2H_3O_2$] and [$C_2$mim][$C_2F_3O_2$].

Illustrative 1-alkyl-3-methyl-imidazolium ionic liquids, [Cn-mim]X [n=4 and 6, X=Cl$^-$, Br$^-$, SCN$^-$, ($PF_6$)$^-$, ($BF_4$)$^-$] and [$C_8$mim]Cl have been prepared. The dissolution of cellulose (fibrous cellulose, from Aldrich Chemical Co.) in those illustrative ionic liquids under ambient conditions with heating to 100° C., with sonication and with microwave heating, has been examined. Dissolution is enhanced by the use of microwave heating. Cellulose solutions can be prepared very quickly, which is energy efficient and provides associated economic benefits.

A contemplated ionic liquid and a solution prepared from such a liquid is substantially free of water or a nitrogen-containing base. As such, such a liquid or solution contains about one percent or less water or a nitrogen-containing base. Thus, when a solution is prepared, it is prepared by admixing the ionic liquid and cellulose in the absence of water or a nitrogen-containing base to form an admixture.

A range of different cations can be employed of those screened from the common sets used to prepare ionic liquids; imidazolium salts appear to be most effective, with the smallest imidazolium cation exhibiting the easiest dissolution. Alkyl-pyridinium salts free of organic base were less effective. Smaller phosphonium and ammonium quaternary salts containing shorter chain alkyl substituents are known, but have higher melting points and are often not liquid within the acceptable range for definition as ionic liquids.

The use of an imidazolium chloride ionic liquid as solvent for cellulose provides a significant improvement over the previously-reported solubility of cellulose in the organic salt/base N-benzylpyridinium chloride/pyridine as discussed in U.S. Pat. No. 1,943,176, and in which the maximum solubility was 5 weight percent. Indeed, additional nitrogen-containing bases as were used in that patent are not required to obtain good solubility of cellulose in the ionic liquids.

Other ionic liquids include, but are not limited to, those ionic liquids disclosed in U.S. Application 2003/0157351 and U.S. Application 2004/0038031, the contents of each being hereby incorporated by reference.

Additives

Any conventional additive used in polymeric formulations can be incorporated into the resins and blends of the present invention. If these additives are incorporated during the dissolution stage of resin or blend, it is important that such additives do not interfere with the solute-solvent and solvent-solvent interactions. Examples of conventional additives include, but are not limited, plasticizers, fillers, colorants, UV-screening agents and antioxidants. Other additives include, but are not limited to those additives disclosed in U.S. Application 2004/0038031.

The inventive process is further illustrated, using the following examples, but there is no intention that the invention be restricted thereto.

EXAMPLES

Example 1

Polyacrylonitrile Sissolution in [$C_4$mim]Cl and Reconstitution

Polyacrylonitrile (PAN) is typically processed in polar aprotic solvents such as dimethylformamide, dimethyl-sulfoxide (DMSO), and γ-butyrolactone, as well as a few molten salts such as M$^+$SCN$^-$ (M: Li, Na, K). Due to the fact that PAN and cellulose are readily dissolved by the aforementioned solvents, blends of cellulose/PAN are well studied and characterized.

Up to 10 wt % of PAN has been successfully dissolved in the ionic liquid [$C_4$mim]Cl at room temperature. The solutions of PAN/IL can be reconstituted in a similar fashion to cellulose-in-IL reconstitution. Using water as a coagulating solvent, flocks, fibers, films and molded forms can be generated, depending on the method of regeneration. For example, pouring IL/PAN solutions in the rapidly stirring water will result in a powdery floc, whereas extruding solutions through a syringe into water allows for the formation of fibers/rods. Finally films can be produced using coating rods to form a uniform layer of IL/PAN on a glass plate. Once the films are produced the IL is gently removed using water.

After washing the films with copious amounts of water, they were allowed to dry in an oven at 104° C. As the water was evaporated the films began to shrink to form hard, porous films with pore sizes ranging from 10-20 μm in diameter, as shown in FIG. 1. FIG. 2 shows TGA curves for pure PAN and reconstituted PAN from [$C_4$mim]Cl. For the pure PAN the onset of decomposition is approximately 290° C., while the regenerated PAN, exhibits a lower onset temperature for decomposition, but a higher char yield until 800° C. TGA of regenerated PAN indicated a small amount of [$C_4$mim]Cl might be trapped or encapsulated within the PAN matrix during the regeneration process.

Example 2

Cellulose/Polyacrylonitrile (PAN) blend in [$C_4$ mim]Cl

A 5% cellulose (DP=1056) and a 2% PAN (Mw=86,000) solution were each prepared in [$C_4$mim]Cl. Dissolution was achieved with mixing at 104° C. over 48 h time period. The two solutions were then mixed at 104° C. in varying proportions; yielding relative composition ranges of the two polymers from 20/80 to 80/20, as a ratio of weight percent of cellulose to PAN. Next the blended solutions were allowed to cool, and then coagulated as membranes using water. The films were then placed in a water bath and allowed to soak for 24 h, in order to allow the maximum amount of IL to diffuse from the blended composite. Finally the composites were washed several times with water. The resulting soft, flexible cellulose/PAN membranes were dried in the oven for 24 h. The resulting films were then analyzed using SEM and DSC. FIG. 3 shows a series of SEM pictures for cellulose/PAN blends. On examination of the photographs, it appears that the surface is homogenous-indicating a miscible blend at all ratios from FIG. 3B to FIG. 3E. The blended materials all have different textures then that of the pure cellulose (A) or the pure PAN (F).

Example 3

Cellulose/PHEMA blend in [$C_4$ mim]Cl

Blends of cellulose and PHEMA were prepared as above, and displayed similar characteristics to the blends of cellulose/PAN. The cellulose/PHEMA blends formed using [$C_4$mim]Cl appear to form miscible blends from SEM in FIG. 4.

Example 4

Cellulose/Polyvinyl alcohol (PVA) blend in [$C_4$ mim]Cl

Cellulose/PVA blends were prepared as in the previous examples, and are another example of miscible blends. The cellulose/PVA membranes were colorless with good flexibility. FIG. 5 indicates that the cellulose/PVA blends were quite smooth and homogenous.

Example 5

Cellulose with Polyaniline Base Blend. (Immiscible Example)

Polyaniline base (PANI) is a blue polymer. Compositions of cellulose and PANI are examples of immiscible blends. The preparation of these materials was the same as the miscible blends. The SEM analysis shown in FIG. 6 indicates that the typical phase separation has taken place, especially for the low cellulose percentages. Unlike the previous miscible examples which appeared to be homogeneous, cellulose/PANI blends were not miscible. PANI is a non-conductive polymer, but its polyaniline emeraldine base is a conductive polymer; therefore, it should be useful in conductive membranes at specific pH.

Example 6

Cellulose/Polyethylene/Glycol-2000 (PEG) Blend (Immiscible Blend)

PEG-2000 showed good dissolution in [$C_4$mim]Cl at temperature above the melting point of PEG (60° C.). At temperatures below 60° C. it would precipitate from solution. FIG. 7 shows the apparent phase separation between cellulose and PEG after blending and reconstitution.

The invention claimed is:
1. A process for preparing a polymer blend, comprising:
   (a) admixing at least two differing polymeric materials with at least one ionic liquid, wherein the ionic liquid comprises one or more cations and one or more anions and is substantially free of a nitrogen-containing base; and wherein one of the polymeric materials is cellulose and the other is selected from the group consisting of starch, chitin, polyolefin, polyacrylonitrile, poly-2-hydroxymethylmethacrylate, poly-2-hydroxyethylmethacrylate, polyvinyl alcohol, linear polyethyleneimine, branched polyethyleneimine, polyaniline, polyethylene glycol, and polyethylene oxide with terminal amine groups; and
   (b) adding a non-solvent to the composition of step (a), wherein the non-solvent dissolves the ionic liquid but not the polymeric materials,
   thereby providing the polymer blend and a liquid phase comprising the ionic liquid.
2. The process of claim 1, wherein step (a) further comprises heating to about 100° C. to about 150° C.
3. The process of claim 2, wherein the heating is by a microwave.
4. The process of claim 1, further comprising separating the blend from the liquid phase comprising the ionic liquid.
5. The process of claim 1, wherein the number of polymeric materials is two.
6. The process of claim 1, wherein the number of polymeric materials is three.
7. The process of claim 1, wherein the number of polymeric materials is four.
8. The process of claim 1, wherein at least one of the polymeric materials further comprises a plasticizer, filler, colorant, UV-screening agent, or antioxidant.
9. The process of claim 1, wherein the ionic liquid has a melting point of less than about 200° C.
10. The process of claim 1, wherein the cation comprises a pyrazole, thiazole, isothiazole, azathiozole, oxothiazole, oxazine, oxazoline, oxazaborole, dithiozole, triazole, selenozole, oxaphosphole, pyrrole, borole, furan, thiophen, phosphole, pentazole, indole, indoline, oxazole, isoxazole, isotriazole, tetrazole, benzofuran, dibenzofuran, benzothiophen, dibenzothiophen, thiadiazole, pyridine, pyrimidine, pyrazine, pyridazine, piperazine, piperidine, morpholone, pyran, aniline, phthalazine, quinazoline, quinoxaline, pyrrolidine, or combinations thereof.
11. The process of claim 1, wherein the cation is an imidazolium cation.
12. The process of claim 1, wherein the cation is a quinolinium or isoquinolinium cation.
13. The process of claim 1, wherein the cation is 1,3-di($C_1$-$C_6$ alkyl or $C_1$-$C_6$ alkoxyalkyl)-imidazolium.

14. The process of claim 1, wherein the cation is 1-($C_1$-$C_6$ alkyl)-3-methyl-imidazolium.

15. The process of claim 1, wherein the anion comprises a halogen, $BF_4^-$, $PF_6^-$, $AsF_6^-$, $SbF_6^-$, $NO_2^-$, $NO_3^-$, $SO_4^{2-}$, phosphate, phosphite, carboxylate, or triflate.

16. The process of claim 1 wherein the anion is a halogen.

17. The process of claim 1, wherein the ionic liquid comprises a 1-alkyl-3-methyl imidazolium cation and the anion comprises $Cl^-$, $Br^-$, $SCN^-$, $PF_6^-$, or $BF_4^-$.

18. The process of claim 1, wherein the non-solvent comprises a polar liquid.

19. The process of claim 1, wherein the non-solvent comprises an alcohol.

20. The process of claim 1, wherein the non-solvent comprises water.

21. The process of claim 1, wherein the anion comprises a carboxylate.

22. The process of claim 21, wherein the anion is acetate.

23. The process of claim 1, wherein at least one of the polymeric materials comprises chitin.

24. A mixture comprising at least two differing polymeric materials where one of the polymeric materials comprises cellulose and the other polymeric material comprises polyacrylonitrile, poly-2-hydroxyethylmethacrylate, polyvinyl alcohol, polyaniline, or polyethylene glycol and at least one ionic liquid, wherein the ionic liquid comprises one or more cations and one or more anions.

25. The mixture of claim 24, wherein the number of polymeric materials is three.

26. The mixture of claim 24, wherein the number of polymeric materials is four.

27. The mixture of claim 24, wherein at least one of the polymeric materials further comprises a plasticizer, filler, colorant, UV-screening agent, or antioxidant.

28. The mixture of claim 24, wherein the ionic liquid is substantially free of water or a nitrogen-containing base.

29. The mixture of claim 24, wherein the ionic liquid has a melting point of less than about 200° C.

30. The mixture of claim 24, wherein the cation comprises a pyrazole, thiazole, isothiazole, azathiozole, oxothiazole, oxazine, oxazoline, oxazaborole, dithiozole, triazole, selenozole, oxaphosphole, pyrrole, borole, furan, thiophen, phosphole, pentazole, indole, indoline, oxazole, isoxazole, isotriazole, tetrazole, benzofuran, dibenzofuran, benzothiophen, dibenzothiophen, thiadiazole, pyridine, pyrimidine, pyrazine, pyridazine, piperazine, piperidine, morpholone, pyran, aniline, phthalazine, quinazoline, quinoxaline, pyrrolidine, or combinations thereof.

31. The mixture of claim 24, wherein the cation is an imidazolium cation.

32. The mixture of claim 24, wherein the cation is a quinolinium or isoquinolinium cation.

33. The mixture of claim 24, wherein the cation is 1,3-di ($C_1$-$C_6$ alkyl or $C_1$-$C_6$ alkoxyalkyl)-imidazolium.

34. The mixture of claim 24, wherein the cation is 1-($C_1$-$C_6$ alkyl)-3-methyl-imidazolium.

35. The mixture of claim 24, wherein the anion comprises a halogen, $BF_4^-$, $PF_6^-$, $AsF_6^-$, $SbF_6^-$, $NO_2^-$, $NO_3^-$, $SO_4^{2-}$, phosphate, phosphite, carboxylate, or triflate.

36. The mixture of claim 24, wherein the anion is a halogen.

37. The mixture of claim 24, wherein the ionic liquid comprises a 1-alkyl-3-methyl imidazolium cation and the anion comprises $Cl^-$, $Br^-$, $SCN^-$, $PF_6^-$, or $BF_4^-$.

38. The mixture of claim 24, further comprising a non-solvent, wherein the non-solvent can dissolve the ionic liquid but not the polymeric materials.

39. The mixture of claim 38, wherein the non-solvent comprises a polar liquid.

40. The mixture of claim 38, wherein the non-solvent comprises an alcohol.

41. The mixture of claim 38, wherein the non-solvent comprises water.

42. The mixture of claim 24, wherein the anion comprises a carboxylate.

43. The mixture of claim 42, wherein the anion is acetate.

44. A process for preparing a polymer blend, comprising:
(c) admixing at least two differing polymeric materials with at least one ionic liquid, wherein the ionic liquid comprises one or more cations and one or more anions and is substantially free of a nitrogen-containing base; and wherein one of the polymeric materials is chitin and the other is selected from the group consisting of starch, polyolefin, polyacrylonitrile, poly-2-hydroxymethylmethacrylate, poly-2-ydroxyethylmethacrylate, polyvinyl alcohol, linear polyethyleneimine, branched polyethyleneimine, polyaniline, polyethylene glycol, and polyethylene oxide with terminal amine groups; and
(d) adding a non-solvent to the composition of step (a), wherein the non-solvent dissolves the ionic liquid but not the polymeric materials,
thereby providing the polymer blend and a liquid phase comprising the ionic liquid.

45. A mixture comprising at least two differing polymeric materials where one of the polymeric materials comprises chitin and the other polymeric material comprises polyacrylonitrile, poly-2-hydroxyethylmethacrylate, polyvinyl alcohol, polyaniline, or polyethylene glycol and at least one ionic liquid, wherein the ionic liquid comprises one or more cations and one or more anions.

* * * * *